United States Patent

[11] 3,630,064

| [72] | Inventor | Maurice W. Mahns<br>Pittsburgh, Pa. |
|---|---|---|
| [21] | Appl. No. | 867,492 |
| [22] | Filed | Oct. 20, 1969 |
| [45] | Patented | Dec. 28, 1971 |
| [73] | Assignee | Aluminum Company of America<br>Pittsburgh, Pa. |

[54] FLEXING DIE MEMBER FOR INDIRECT EXTRUSION
6 Claims, 3 Drawing Figs.

| [52] | U.S. Cl. | 72/253,<br>73/272, 72/273, 72/467 |
|---|---|---|
| [51] | Int. Cl. | B21c 23/00,<br>B21c 3/00 |
| [50] | Field of Search | 72/467,<br>468, 253, 273, 272; 207/17, 18 |

[56] References Cited
UNITED STATES PATENTS

| 3,522,721 | 8/1970 | Whiting | 72/273 |
|---|---|---|---|
| 3,530,702 | 9/1970 | De Ridder | 72/272 |
| 3,436,952 | 4/1969 | Hajikano | 72/467 |
| 1,743,687 | 1/1930 | Robertson | 72/272 |
| 3,513,681 | 5/1970 | Monestam | 72/467 |

*Primary Examiner*—Charles W. Lanham
*Assistant Examiner*—Michael J. Keenan
*Attorney*—E. Strickland ABSTRACT: An extrusion process and apparatus in which a die member is provided with an annular recess in the periphery thereof. The recess permits radial expansion of the front portion thereof when the member and extrusion material are forced together under extrusion pressure, and radial contraction when the extrusion pressure is terminated.

PATENTED DEC28 1971  3,630,064
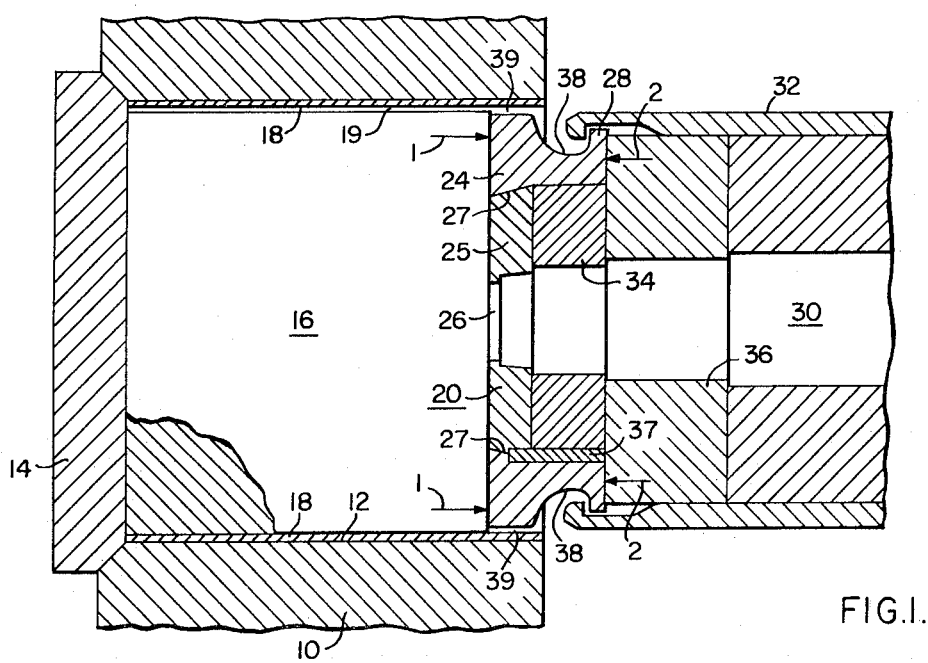
FIG.1.
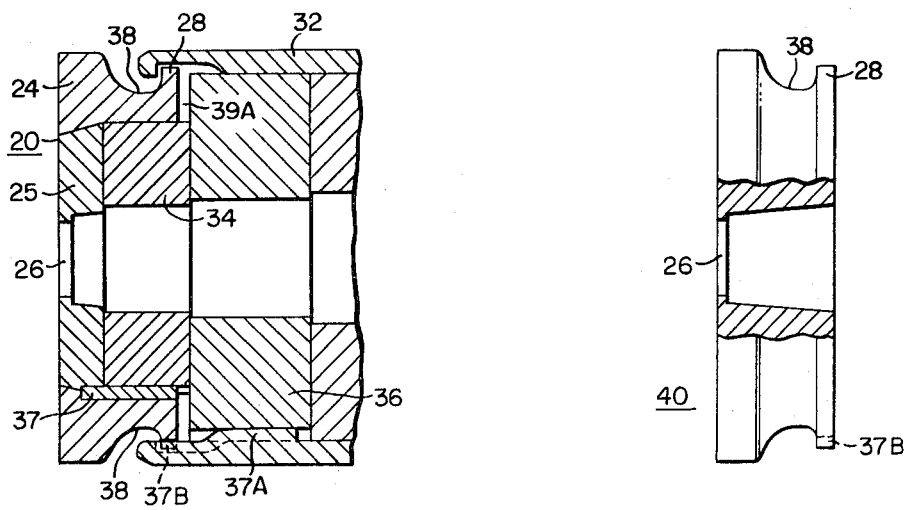
FIG.2.
FIG.3.
INVENTOR
Maurice W. Mahns
BY E. Strickland
ATTORNEY 3,630,064

FLEXING DIE MEMBER FOR INDIRECT EXTRUSION

BACKGROUND OF THE INVENTION

The present invention relates generally to indirect extrusion processes and apparatus, and particularly to an extrusion die member or holder that permits its return through an extruding cylinder or container, the return of the die member requiring a minimum amount of power and effecting maximum savings in "dead cycle time" in the extruding process.

Heretofore, it has been the general practice in indirect extrusion presses and processes, to remove the die member from a hollow ram supporting same before the ram was returned and withdrawn through a container confining the material being extruded. After the ram was withdrawn from the container, the die was reattached to the ram for the next extrusion stroke or cycle of the operation.

The primary reason for this method of operation is the difficulty in returning or retracting the ram with the die in place. During the extrusion cycle, a shell or "skull" of the extrusion material is formed in the container, and adheres to the interior surface thereof, as the die travels within the container and against the extrusion material, the bulk of the material, of course, being forced through a die opening and through the hollow ram. The container itself expands slightly as a result of the extrusion material expanding against the container as the die moves against the material. When extrusion pressure is released, the container contracts and the shell or skull forms an effective impediment to the withdrawal and return of the die or die holder through the container, i.e., the ram may be withdrawn with the die member in place but withdrawal requires a substantial amount of power as well as an increase in the size and strength die holding structures attached to the ram, both of which add substantially to the cost of the apparatus as well as reducing the size of the bore in the ram. The reduced bore limits the overall size of the extrusion or number of extrusions that can pass through the ram. The withdrawal of the die also causes some of the skull to return with the die. This return skull must be removed to prevent problems of galling between the ram and the container. For these reasons, it has been the practice, as explained above, to remove the die member so that the ram could be returned to its initial position with relative ease and minimum power requirements.

This removal and reassembling of parts, however, required lengthy periods of time in which no extruded product was being produced so that the savings and advantages attained in the use of lower strength rams and less power were offset by the costly "dead cycle time" required by the die removal and reassembling process.

Another problem encountered in indirect extrusion methods and devices is that of trapped air in the container, and the venting of this air from the container. When the die moves against an ingot of extrusion material for subsequent extrusion cycles, the die forms a seal with the skull in the contracted container so that air is trapped in the container in an area between the ingot and skull, and exits with the material of the ingot as the material passes through the die openings. Since the air is between the ingot and the container, it leaves the container on the surface of the material as it is being extruded. This air, as it moves through the container and through the die opening under pressure and at appropriate temperatures tends to produce pock marks and blisters on the surface of the extruded product.

Further, trapped air, in combination with lubricants, and under appropriate temperature and pressure conditions, can be ignited to cause explosive damage to the surface of the die opening and to the extruded product.

BRIEF SUMMARY OF THE INVENTION

The present invention provides a relatively simple and inexpensive structure which overcomes the problems outlined above. Broadly, this is accomplished by use of a flexing, radially expandable and contractable extrusion die member, the die member ordinarily having an outer diameter somewhat smaller than the inner diameter of the container and of the skull therein confining the material, an ingot for example, to be extruded. In this manner, a relatively small annular space is provided between the container and the periphery of the die member. When the die member and the material are moved (relatively) against each other with a force sufficient to start the crushing of the ingot, the air within the container escapes therefrom around the periphery of the die member thereby substantially eliminating the problems associated with trapped air. As pressure within the container increases to a level sufficient to force the material of the ingot through a die opening in the die member, the member flexes to undergo elastic radial expansion, and the ingot expands to be pressed solidly against the skull. As the radially expanded die moves into the ingot and skull, it cuts a diameter therein the size of the die in its expanded state. This diameter is slightly larger than the diameter of the container and skull when extrusion pressure is released. With release of extrusion pressure, the expanded die contracts to an outside diameter slightly less than the diameter of the contracted container and skull thereby permitting its easy withdrawal and return through the container without the necessity of die removal and reinstallation, and without costly expenditures for increased power and ruggedization of ram components.

As explained in detail hereinafter, the die member can be made to expand by establishing a couple between front and rear portions thereof during the extrusion process, the couple being the preferred method, or by the wedging action of a die insert movable within a die holder on mating beveled or inclined surfaces.

THE DRAWING

The invention, along with its advantages and objectives, will be more apparent from consideration of the following detailed description taken in connection with the accompanying drawing in which:

FIG. 1 is a partial longitudinal section of an extrusion apparatus showing a die member constructed in accordance with the principles of the invention;

FIG. 2 is a longitudinal section of a modification of the apparatus depicted in FIG. 1; and FIG. 3 is a side elevation view of another embodiment of the invention.

PREFERRED EMBODIMENTS

FIG. 1 shows, in partial longitudinal section, a container 10, forming part of an overall extrusion press (not shown), and having an internal bore surface 12 terminated at one end by an end wall 14. Within the container is disposed and confined an ingot 16 of a material to be extruded by an extrusion die member 20 constructed in accordance with the principles of the invention. On the interior surface of the container is shown a shell or "skull" 18 of ingot material, the skull forming and adhering to the container surface after one or more extrusion cycles have been completed. Between the skull and the top of the ingot is shown a small space 19.

In the embodiment depicted in FIG. 1, the die member 20 is a composite structure comprising an outer die holder 24 and an inner die insert 25 having an opening 26 through which the material of the ingot 16 is extruded when the die member and ingot are forced together under force of an extrusion pressure. A wedge fit 27 is provided between the holder and insert by mating beveled surfaces provided respectively on the insert and in the holder.

The die holder 24 is provided with an annular flange 28 at the rear thereof, the flange being employed as means to attach the die holder to a hollow ram only partially shown and generally designated 30. As shown in FIG. 1, this is accomplished by a tubular clamp or clamping sleeve 32 secured over the flange 28, the clamp similarly engaging a flanged portion or portions of the ram not shown. The outer diameter of the rear flange is less than that of the front portion of the die holder in order to accommodate the thickness of the clamping sleeve 32 within the bore 12 of the container 10. Thus, the outer diameter of the clamping sleeve should be no more than that of the die holder.

Behind the die insert 25 is an annular die block 34 disposed in abutting relation with another backing block structure 36 held in place by the clamp 32, and forming part of the ram structure 30. The block 34 and the die insert 25 are secured against relative rotation with respect to the die holder 24 by a key 37 disposed in aligned slots provided in the die holder, the die block and the die insert. In a similar manner, as shown in FIG. 2, the die holder is held in fixed relation to the ram by an integral key 37A (forming an integral part of the clamping sleeve 32) disposed in a keyway provided in the block 36 and extending into a slot 37B provided in the flange 28 of holder.

In accordance with the invention, the periphery of the die holder 24 is provided with a couple forming annular recess 38, operative in a manner presently to be explained, and an outer diameter smaller than that of the skull 18 (and thus the container bore 12), the smaller diameter providing an annular clearance space 39 between the die holder and the skull when the die holder is disposed within the container 10. In FIG. 1, the space 39 is somewhat exaggerated for purposes of illustration. In operation of the structure as thus far described, the ram 30 or the container 10 is moved relative to the other as the front face of the die member 20 is pressed against the ingot 16 confined in the container. Either the container can be translated in the direction of the ram, or the ram moved in the direction of the container or both can be moved. In any case, the translation is effected by a suitable mechanism (not shown) capable of generating a force sufficient to extrude the material of the ingot through the opening 26 in the die insert 25.

As extrusion pressure is applied and the die member 20 presses against the ingot 16, a rearwardly directed force is applied against the front face of the die member, the force extending across the entire area of the front face of the member. This force produces an opposing, resistant force on the rear face of the die member 20, this resistant force being directed towards the ingot (i.e., to the left in the drawing) by the backing block 36. By virtue of the annular recess 38 provided in the periphery of the die holder, these opposing forces are offset in the manner substantially as indicated by the opposing arrows 1 and 2 to thereby establish a couple in the die holder. Under action of these forces, the couple in the die holder. Under action of these forces, the couple permits radially outwardly directed bending and elastic expansion of the front portion of the die holder in an amount sufficient to substantially close the annular space 39 between the skull 18 and die holder and thereby block the flow of extrusion material therethrough. When the extruding pressure is terminated and the opposing forces disappear, the couple disappears and the die holder elastically contracts and returns to its original diameter. The die holder is now clear of the interior of the container and of any skull that may be adhering to the inside surface of the container. The die holder is thus free to be easily withdrawn and returned through the bore 12 without the time consuming, and therefore costly, process of moving the die member beyond the (left hand) end of the container to gain access to the member, removing the die member from the ram 30, withdrawing the ram to the other (right-hand) end of the container and beyond, and relocating the die member on the ram for another extrusion stroke or cycle. As can be readily appreciated, in the present invention, the ram, with die member in place, can be rapidly returned for each extrusion process, the only interruption in the back and forth movement of the ram being the time required to remove the butt (not shown) of the extruded ingot and to recharge the chamber of the container with a full sized ingot.

Because the die member 20 is free of the container interior and skull, the invention has the further advantages of needing only minimum power requirements for the return cycle of the ram 30, and minimum strength requirements for ram construction thereby permitting a maximum size bore in the ram. If the ram was required to pull the die member 20 through the container in tight engagement with the skull, substantial additional power would be required as well as strengthening of ram components, such as the clamping sleeve 32. Strengthening of the sleeve would involve increasing its thickness which would, it turn, reduce the inner diameter of the ram bore. A reduced size bore reduces the size of the product than can be extruded and thus the overall flexibility of the extrusion apparatus.

In extruding devices, when the die and extrusion material or ingot come together under force of an extruding pressure, the material expands radially to fill any space that exists between it and the container, for example the space 19 indicated in FIG. 1. The die, in turn, effectively seals the end of the container even though there may be some radial expansion of the container under the force of the expanding extrusion material. With the container being sealed by the die, air in container is trapped, and as the ingot expands to fill the container, the air is forced out through the die opening along the outer surface extruded material. The pressure and temperature conditions are often such that the air will either pock mark the surface of the extruded product or the air is forced beneath the skin of the product to blister the same, or both. Further, as mentioned earlier, such pressure and temperature conditions, in combination with lubricants, can be ignited to cause damaging explosions to the extrusion die as well as to the product.

In the present invention, when the die member 20 and the ingot 16 are forced together for the start of the extrusion process, and the ingot expands to fill the space 19 in the container 10, the air in the container escapes therefrom past the die member via the annular space and clearance 39.

Thus, the die structure of the invention provides yet another advantage over prior art devices by permitting air within the container to escape thereby substantially eliminating the detrimental effects of trapped air on the extruded product, and the possibility of damaging explosions.

In the invention, the die member 20 must be designed for the particular radial expansion desired, taking into consideration the expansion of the extrusion container during the extrusion cycle and the relative hardness of the ingot or other material being extruded. In this regard, the size of the couple forming, annular recess 38 in the die holder 24 determines the amount of offset of the opposing forces (indicated by arrows 1 and 2) on the die member 20.

In the embodiment of FIG. 1, when the die holder 24 expands, during the extrusion process, there may be a tendency for the die insert 25 to separate from the holder and thus form a gap along the wedge fit 27 formed by the beveled surfaces respectively provided on the insert and in the holder. If such a gap is formed, extrusion material may enter therein. To substantially reduce the likelihood of a gap at the wedge fit 27, the die block 34 located behind the die insert may be lengthened slightly to extend beyond the plane of the rear face of the die holder 24 as shown in FIG. 2. In this manner, a space 39A is provided between the rear face of the holder and the front face of the block 36. The force of the ram 30 acting through the block 36 during the extrusion process moves forwardly to push the insert into the holder to maintain the wedge fit tight at all times. For purposes of illustration, the space 39A is exaggerated somewhat in the showing of FIG. 2.

The structure as generally depicted in FIG. 2 may further be employed as a means to effect expansion of the die holder 24 in place of that of the couple action provided by the annular recess 38, or in combination therewith. In either case, the reactive force applied to die member 20 by the die block 34 during the extrusion stroke can be used to force the insert 25 into the holder, the beveled surfaces of the insert and holder providing a wedging action that is effective to flex the holder in a radially outward direction. When the extrusion pressure is terminated, the force of the die block against the insert is removed thereby allowing the force of the ingot on the front of the insert to move the insert toward the ram 30 and thus permit the die holder to contract to its original diameter.

In FIGS. 1 and 2, the embodiment of the invention has been described with reference to a composite die structure 20 in which a die insert 25 is held in an outer die holder 24 by a die block 34 disposed in abutting relation to a block 36 forming part of a ram 30. The insert and die block were prevented from relative rotation with respect to the die holder by a key 37.

The die member 20, however, need not be a composite die structure requiring the die components described above in order to function in accordance with the inventive principles described herein. As shown in FIG. 3 (in side elevation), the die member can be an integral, unitary structure 40 having the couple forming annular recess 38 in the periphery as in the die holder 24 of FIGS. 1 and 2. Its operation in the extrusion process is essentially the same as the described above in connection with the couple in the die holder 24. The forces on the front and rear of the die member 40 during an extrusion stroke operate to flex the front portion thereof so that the front portion moves to close the clearance 39 existing between the skull 18 and the periphery of the front portion. When these forces are terminated after completion of the extrusion stroke, the front portion of the die contracts for its ready withdrawal through the bore of the container.

From the foregoing description it should now be apparent that new and useful expandable die structure has been disclosed for indirectly extruding a material in an effective, economical manner, the structure overcoming certain problems heretofore troublesome in the extruding art. Particularly, the invention is directed to a die structure that will expand elastically within an extrusion container when the die is forced against a material confined therein under extrusion pressure, and contract when the extrusion pressure is terminated. In this manner the die can be easily withdrawn through the container to thereby eliminate the costly, time delaying process of removing the die for the withdrawal stroke, and redisposing the die for the next extrusion stroke. Further, such a die structure requires minimum power for the withdrawal stroke, and minimum strength components in the die supporting ram thereby allowing a maximum opening in a hollow ram. In addition, the die permits air to escape from the extrusion container thereby eliminating the detrimental effects of trapped air as outlined above.

Though the invention has been described with a certain degree of particularity, changes may be made therein without departing from the spirit and scope thereof.

Having thus described my invention and certain embodiments thereof, I claim:

1. Apparatus for extruding a material confined in a container, said apparatus comprising
    a container,
    a hollow ram, and
    a die member attached to one end of said ram, and disposed for relative movement with and in said container to engage the material confined therein,
    said die member having an annular recess provided in the periphery thereof, and an outer diameter less than the internal diameter of said container so that a relatively small annular clearance space is formed between the periphery of said member and the interior of said container,
    said annular recess providing in said die member a mechanical couple when the member and the material in the container are forced together under extrusion pressure,
    said couple permitting elastic radial expansion of the portion of said die member in engagement with the material, said radial expansion being effective to reduce said clearance space when said member and the material in said container are forced together under extrusion pressure, and to permit elastic radial contraction of the die member when extrusion pressure is terminated.

2. The structure described in claim 1 in which the die member comprises a die holder and a die insert centrally supported in said holder,
    means associated with said die insert extending beyond the plane of the rear face of said holder, and disposed in abutting engagement with the hollow ram, and
    said die holder and said die insert having annular beveled surfaces disposed in mating engagement,
    said die insert serving to effect the radial expansion of said die holder when the die member and the material in the container are forced together under extrusion pressure.

3. A method of extruding a material confined in an extrusion container with a die member having an annular recess in the periphery thereof, and an outer diameter less than the inner diameter of said container so that a relatively small annular clearance space is provided between said member and said container, the method comprising the steps of
    effecting relative movement of said die member in and relative to said container and against said material to extrude the same through an opening in said die member, said member radially expanding under extrusion pressure to reduce said clearance space while simultaneously permitting air within said container to escape therefrom, and
    withdrawing said die member through said container after the extrusion of said material is completed, said member having radially contracted therebefore when extrusion pressure is terminated.

4. The method described in claim 3 in which the radial expansion of the die member is effected by establishing a couple between front and rear portions thereof when the die member moves against the material in the container under extrusion pressure.

5. The method described in claim 3 in which the radial expansion of the die member is effected by axially moving a die insert into a die holder along mutually engaged beveled surfaces respectively provided on and between said die insert and said die holder.

6. A die member for use in extrusion apparatus, said member having means for engagement with one end of a hollow extrusion ram, and adapted for relative movement with and in a container for receiving and confining a material to be extruded,
    said die member having an annular recess in the periphery thereof of such a dimension and depth that a mechanical couple is established in the die member allowing the member to flex elastically in a radially outwardly direction when the member and a material to be extruded are forced together under extruding pressure in an extrusion process.

* * * * *